(12) United States Patent
Heidtmann et al.

(10) Patent No.: US 10,946,948 B2
(45) Date of Patent: Mar. 16, 2021

(54) SLIDE AND ROTATING COCKPIT DOOR AND METHOD

(71) Applicants: Airbus Operations GmbH, Hamburg (DE); Airbus Americas, Inc., Wichita, KS (US)

(72) Inventors: Andreas Heidtmann, Fredenbeck (DE); David Will, Mobile, AL (US); Roland Lange, Nottensdorf (DE); Sassa Nadine Boos, Schenefeld (DE)

(73) Assignees: Airbus Operations GmbH, Hamburg (DE); Airbus Americas, Inc., Wichita, KS (US)

( * ) Notice: Subject to any disclaimer, the term of this patent is extended or adjusted under 35 U.S.C. 154(b) by 350 days.

(21) Appl. No.: 16/021,489

(22) Filed: Jun. 28, 2018

(65) Prior Publication Data
US 2020/0001965 A1 Jan. 2, 2020

(51) Int. Cl.
*B64C 1/14* (2006.01)
*E06B 3/50* (2006.01)

(52) U.S. Cl.
CPC .......... *B64C 1/1461* (2013.01); *B64C 1/1469* (2013.01); *E06B 3/5018* (2013.01); *E05Y 2201/624* (2013.01); *E05Y 2900/502* (2013.01)

(58) Field of Classification Search
CPC ... B64C 1/1407; B64C 1/1438; B64C 1/1461; B64C 1/1469; E06B 3/5009; E06B 3/5018; E05Y 2900/502
See application file for complete search history.

(56) References Cited

U.S. PATENT DOCUMENTS

| | | | | |
|---|---|---|---|---|
| 1,539,142 A * | 5/1925 | Peterson | ............... | E06B 3/50 49/253 |
| 1,590,545 A * | 6/1926 | Peterson | ............... | E06B 3/50 49/252 |
| 1,621,463 A * | 3/1927 | Estrada | ............... | E06B 3/50 49/248 |
| 1,758,893 A * | 5/1930 | Schaffert | ............... | E06B 3/50 49/252 |
| 1,760,994 A * | 6/1930 | Piotti | ............... | E06B 3/50 49/252 |
| 3,020,604 A * | 2/1962 | Bransford, Jr. | ....... | E06B 3/5018 49/251 |
| 9,045,214 B2 | 6/2015 | Koch et al. | | |

(Continued)

FOREIGN PATENT DOCUMENTS

DE 10 2011 009481 A1 7/2012
EP 2 230 174 A2 9/2010

(Continued)

OTHER PUBLICATIONS

European Search Report for Application No. 19182909.2 dated Dec. 2, 2019.

*Primary Examiner* — Richard G Davis
(74) *Attorney, Agent, or Firm* — Jenkins, Wilson, Taylor & Hunt, P.A.

(57) ABSTRACT

A door assembly for a vehicle. The door assembly includes a door frame, a door panel, a rotating strut, and a linear door guide. The door opens and closes through a combination of rotating and sliding motion, which minimizes the required operational footprint. The strut is mounted on the door panel such that the strut is hidden from view when the door is in an open position.

17 Claims, 4 Drawing Sheets

(56) References Cited

U.S. PATENT DOCUMENTS

| | | | |
|---|---|---|---|
| 10,378,258 B2* | 8/2019 | Helmikkala | ............ E05D 15/48 |
| 2005/0082433 A1 | 4/2005 | Saku et al. | |
| 2015/0204131 A1* | 7/2015 | Petrat | .................... E06B 3/5018 |
| | | | 49/338 |

FOREIGN PATENT DOCUMENTS

| | | |
|---|---|---|
| EP | 3 243 997 A1 | 11/2017 |
| FR | 332 674 A | 11/1903 |
| GB | 190312212 A | 7/1903 |
| WO | WO 2013/025971 A1 | 2/2013 |

* cited by examiner

SLIDE AND ROTATING COCKPIT DOOR AND METHOD

TECHNICAL FIELD

The disclosure herein relates generally to the field of entrance areas between interior passages. More particularly, the disclosure herein relates to sliding and rotating doors and methods such as, for example, for use in a cockpit area within a vehicle such as an aircraft or other vehicle.

BACKGROUND

In some applications for passenger vehicles it is desirable to separate portions of the vehicle between pilot or conductor areas and passenger areas. This can be accomplished, for example, using traditional interior doors. In some cases, interior space within the vehicle can be at a minimum. For example, in the case of an aircraft, reserving a space for a swinging door can prevent the use of that space for other purposes, such as seating for cockpit occupants.

Additionally, the construction of an interior door requires that the door is provided with a mounting feature. Historically these mounting features have been combined with other functional equipment (e.g., cabin monuments). This can potentially lead to problems with door latching due to tolerance stack-ups.

There is therefore a need for improved access to the cockpit without interference of installed equipment, while the disadvantage of the impact of equipment movement near the door is improved by decoupling the door from adjacent equipment.

SUMMARY

A door assembly according to the disclosure herein can comprise a door frame, a door panel, one or more strut pivotably connected to the door frame and to a central region of the door panel, and at least one door guide. The door guide can comprise a linear slide rail, a slide saddle, and a hinge that allows the door panel to be pivotably movable at an end of the strut and slidably movable along the linear slide rail.

BRIEF DESCRIPTION OF THE DRAWINGS

A full and enabling disclosure of the present subject matter is set forth more particularly in the remainder of the specification, including reference to the accompanying figures (also referred to as "Fig." or "Figs."), relating to one or more embodiments, in which.

DETAILED DESCRIPTION

Figure 1:
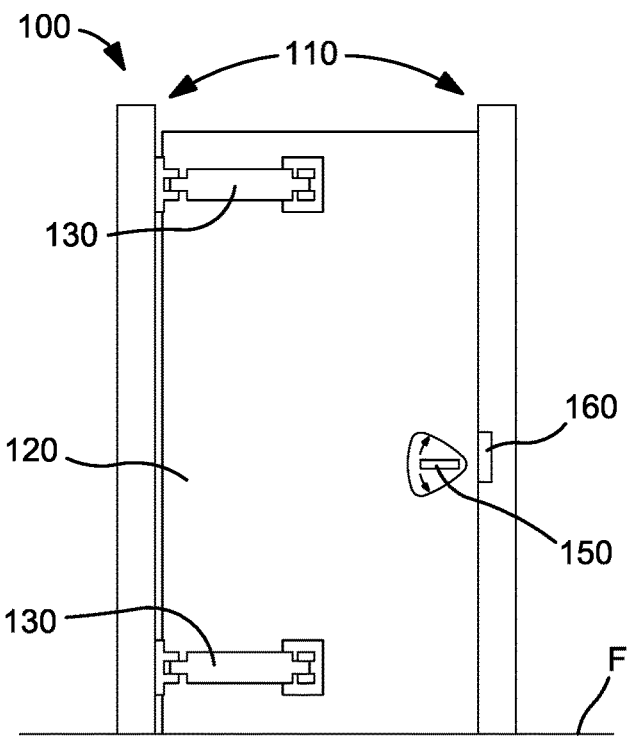
FIG. 1 is a front elevation view of a door assembly according to the disclosure herein.
Figure 2:
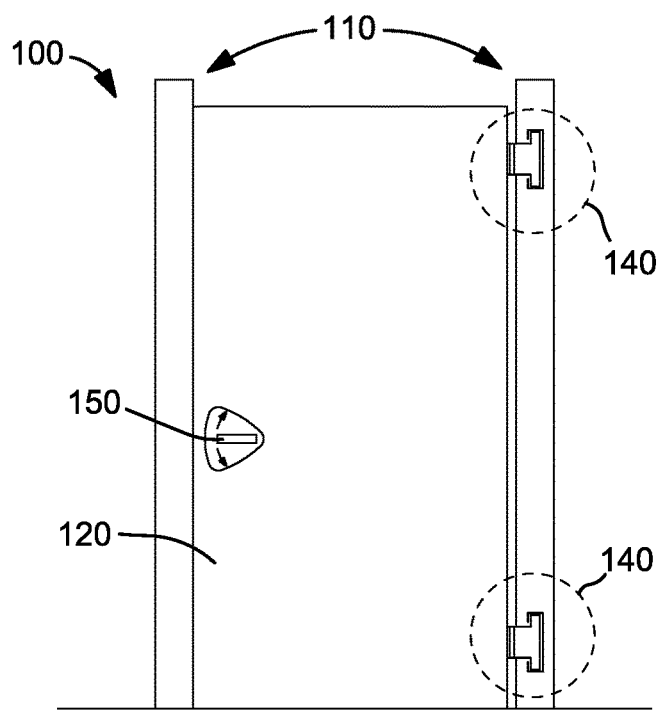
FIG. 2 is a rear elevation view of a door assembly according to the disclosure herein.

Referring to FIGS. 1 and 2, a door assembly, generally designated 100, is depicted. Door assembly 100 can include a door frame generally designated 110, a door or door panel 120, at least one or a plurality of struts 130, and at least one door guide system generally designated 140 (FIG. 2). For the purposes of description, the view of door panel 120 illustrated in FIG. 1 can be referred to as a "front" side of door panel 120, and the view illustrated in FIG. 2 can be referred to as a "rear" side of door panel 120. Door assembly 100 can also include an optional door handle 150 and an optional lock, or locking system 160.

As illustrated in FIG. 1, strut 130 is pivotally coupled to a vertical support of door frame 110 on one side (e.g., vertical support 112, shown in FIGS. 4 through 6) and to a central region of door panel 120 on the opposite side. Door panel 120 engages with another portion of door frame 110 (e.g., vertical support 116, shown in FIGS. 4 through 6) on the opening side. Door assembly 100 opens such that when an operator pulls on the opening side (the right side as illustrated in FIG. 1), door panel 120 swings slightly toward the operator (i.e., out of the plane of the page). At the same time, the hinged side (the left side as illustrated in FIG. 1) slides away from the operator, into the plane of the page. This motion is described in further detail with reference to FIGS. 4 through 6.

Door frame 110 is used for surrounding, mounting, and supporting door panel 120. By pairing door panel 120 with a dedicated door frame 110, the assembly creates a stable structure. Door assembly 100 can be connected to a vehicle floor structure F and optionally to a ceiling structure. In some embodiments, door frame 110 includes three vertical supports (e.g., 112, 114, and 116, shown in FIGS. 4 through 6). The three vertical supports can optionally be in contact with one another by a common interconnection, such as horizontal cross-beams, and which can be located, for example, at a ceiling or floor level. Decoupling the door frame from surrounding equipment provides a rigid support system that reduces the likelihood of door latching failure due to placement tolerances, locations, displacements, etc. of adjacent walls that might otherwise be used as a door-mounting structure. Door assembly 100 can thus function independently from any equipment, structures, monuments, etc. installed next to it.

FIG. 2 illustrates door assembly 100 as illustrated from the opposite or rear side of door panel 120. In this view the linear motion system, which is door guide 140, is illustrated. For clarity, a portion of door frame 110 is not shown (e.g., vertical support 114, illustrated in FIGS. 4 through 6). Door guide 140 is fixedly attached to one or more sections of door frame 110, and door guide 140 and has a sliding connection with door panel 120. In the embodiment shown, door panel 120 is equipped with two door guides 140 and two struts 130, however, it is to be noted that door assembly 100 would operate equally well with only one strut 130 and/or one door guide 140. Similarly, depending on the location, size, weight, etc. of door panel 120, three or more struts 130 and/or door guides 140 can be used.

Figure 3:
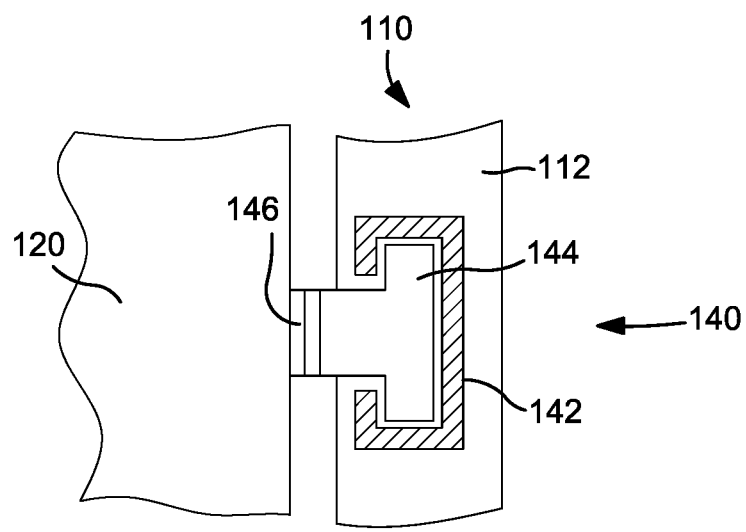
FIG. 3 is a detail view of a linkage according to the disclosure herein.

Referring to FIG. 3, details of door guide 140 are illustrated in a cross-sectional view through a plane parallel to door panel 120 in a closed position. Door guide 140 includes a linear slide rail 142, a slide saddle 144, and a hinge 146. Slide rail 142 is attached on at least one side to a vertical support of door frame 110. In some embodiments, slide rail 142 is fixedly mounted in a horizontal plane between two vertical supports of door frame 110, illustrated previously. Slide saddle 144 is captured within slide rail 142 such that it can slide freely along the length of slide rail 142. Hinge 146 forms a connection between slide saddle 144 and door panel 120. Hinge 146 can be a door hinge that is mounted on one side to an exterior face of slide saddle 144 and on the opposite side to an edge face of door panel 120. This allows door panel 120 to rotate as slide saddle 144 moves in a linear direction along slide rail 142.

Figure 4:
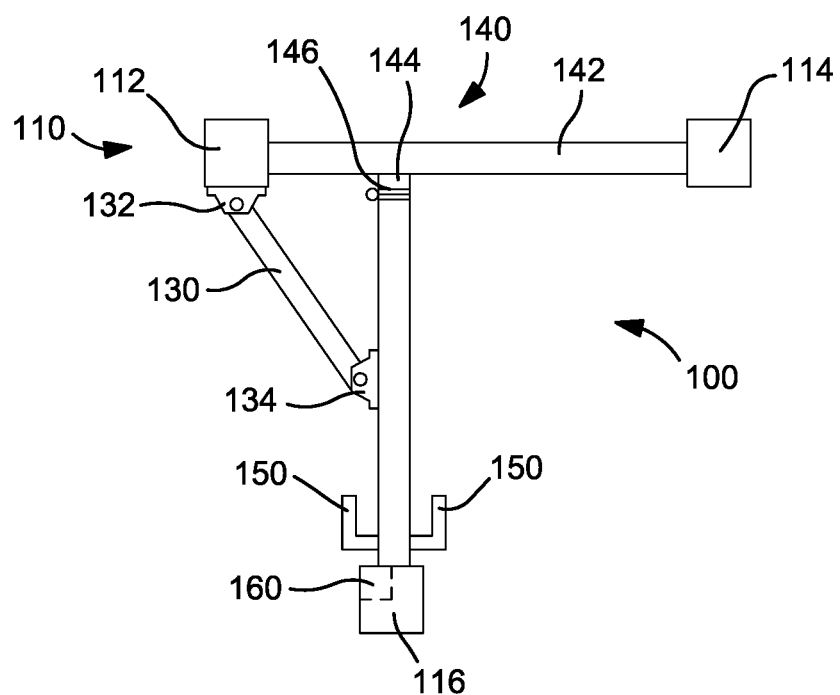
FIG. 4 is a top view of a door assembly in a closed position according to the disclosure herein.
Figure 5:
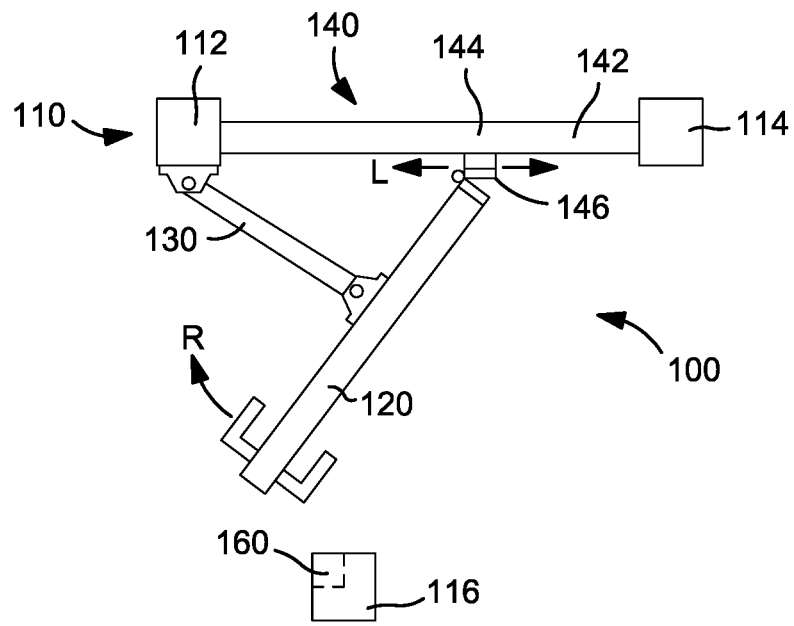
FIG. 5 is a top view of a door assembly in a partially open position according to the disclosure herein.
Figure 6:
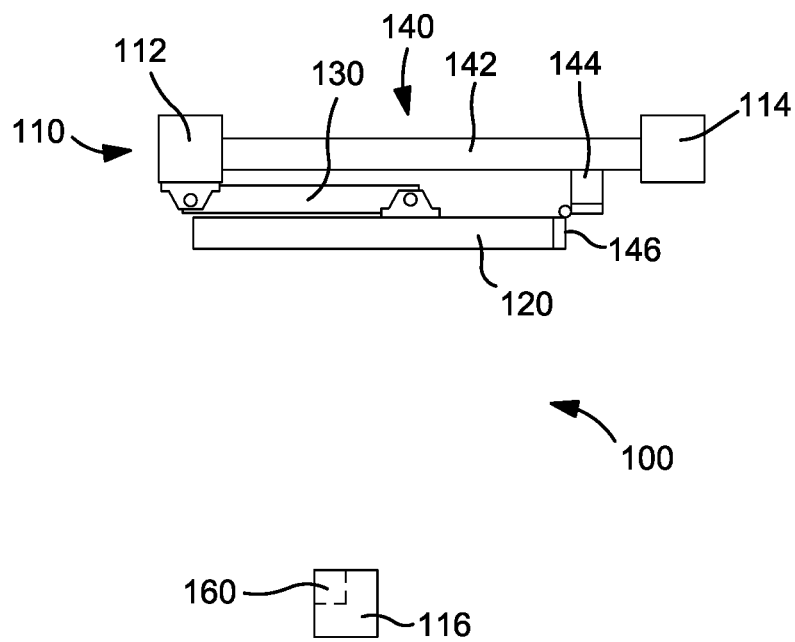
FIG. 6 is a top view of a door assembly in an open position according to the disclosure herein.

FIGS. 4 through 6 depict an embodiment of door assembly 100 in various positions. In the example embodiment shown, door frame 110 includes three vertical supports: 112, 114, and 116. FIG. 4 depicts door assembly 100 is in a closed position. Vertical supports 112 and 114 are arranged in a plane substantially perpendicular to the position of door panel 120 when it is in the closed position. Again for the purposes of description, vertical support 112 can be referred to as a "front" or "first" support. Vertical supports 112 and 114 are positioned on the hinging side of door panel 120. Vertical support 116 is located on the opposing or opening side of door panel 120 at a point between vertical supports 112 and 114 (i.e., such that a top view of the three supports forms an acute triangle shape). Strut 130 is attached to vertical support 112 by a rotating mounting element 132. The opposite end of strut 130 is attached to a substantially central region of the front side door panel 120 by a second rotating mounting element 134. Mounting elements 132 and 134 can be, for example, a pivot joint. Strut 130 can be a single rigid member as depicted, or strut 130 can be formed in multiple parts.

At least one door guide 140 is positioned between vertical supports 112 and 114. Slide rail 142 is attached to vertical supports 112 and 114, and slide saddle 144 is positioned inside slide rail 142 so that it can slide freely between the supports. Slide rail 142 can have a length that is at least as wide as door panel 120. Hinge 144 is mounted on one side to slide saddle 144 and on the opposite side to a thickness or edge face of door panel 120. Hinge 144 is positioned such that the door panel 120 is allowed to slide and rotate as it moves between the open and closed positions.

On the opposite edge of door panel 120, a third vertical support 116 is positioned. Vertical support 116 engages with door panel 120 when door panel 120 is closed. Vertical support 116 can have latching or closing features for door panel 120, such as lock 160 As part of lock 160 or general closing features, vertical support 116 and door panel 120 can include conventional latching elements such as strike catches, latch bolts, etc.

FIG. 5 illustrates door assembly 100 in a partially open or closed position. This position can be initiated by an operator pulling on door panel 120 from the front side (the left side as shown in FIG. 5) from a closed position of door panel 120. Alternatively, an operator would push on door panel 120 from the rear side (the right side as shown in FIG. 5), when door panel 120 is closed. The operator can pull or push on door panel 120, for example, using handle 150 if provided.

As illustrated in FIG. 5, slide saddle 144 has moved away from vertical support 112 and toward vertical support 114, causing door panel 120 to move in a linear motion L. At the same time, Hinge 146 is partially open, allowing strut 130 to rotate with rotational movement R and move door panel 120 toward vertical supports 112 and 114. This rotating and sliding movement continues until door panel 120 reaches a fully open position. In the fully open position, strut 130 is situated on the side of door panel 120 away from the aisle or passageway and next to door guide 140, and door panel 120 is situated in a plane substantially parallel to a plane defined by vertical supports 112 and 114.

An action of closing door panel 120 is accomplished by a reverse motion. From an open position of door panel 120, an operator pulls on handle 150, for example, initiating a sliding motion of door guide 140. Strut 130 rotates away from vertical supports 112 and 114, moving door panel 120 towards vertical support 116. Hinge 146 rotates closed. Slide saddle 144 moves linearly forward towards vertical support 112. This continues until door panel 120 meets vertical support 116. Lock 160 can then be engaged, for example, by bolting latch bolts into strike catches.

FIG. 6 shows door assembly 100 in a fully open position. In this position door or door panel 120 is at least substantially or completely parallel to linear slide 142, and strut 130 is enclosed between them. The combination of rotational movement R and linear movement L, which occurs in the opposite direction of the opening direction of the door, minimizes the movement footprint for door panel 120. In some embodiments, the path of door panel 120 does not cross a plane defined by the front face of vertical support 112 (i.e., a plane parallel to door panel 120 when it is in the closed position).

Figure 7:
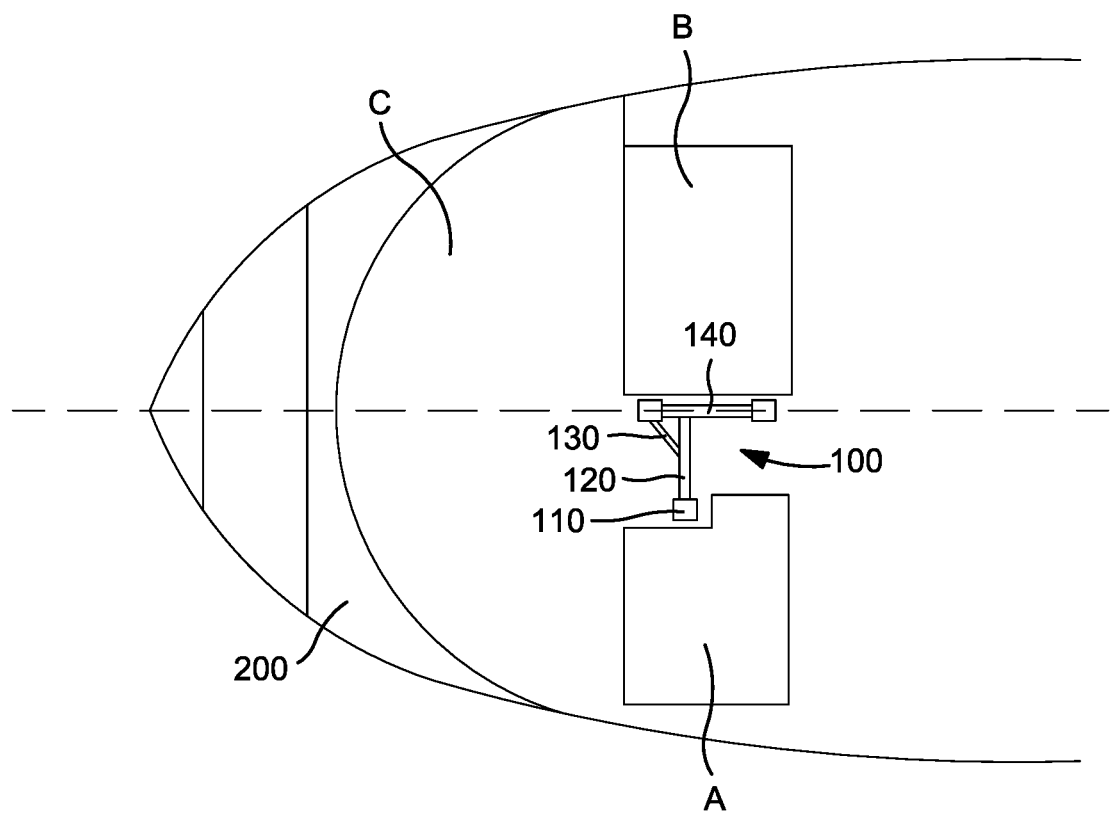
FIG. 7 is a schematic top view of an aircraft with a door assembly according to the disclosure herein.

FIG. 7 illustrates an example application of door assembly 100 in an aircraft 200. In this example embodiment, door assembly 100 can provide advantages over conventional swinging doors. The rotating and sliding movement allows use of the full width of a passageway or aisle in both directions, without protruding into the cockpit area C. In particular, door assembly 100 does not interfere with secondary seating that may be present in the cockpit. Additionally, since door frame 110 is a stand-alone structure, door assembly 100 can be installed independently from cabin monuments A and B. This decouples the design of door assembly 100 from the design of the monuments, potentially allowing less expensive construction of the monuments, which may have less rigid design constraints compared to door assembly 100. Door assembly 100 can further be configured to operate in a cockpit decompression event.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A door assembly comprising:
   a door frame;
   a door panel movable between an open position and a closed position;
   one or more strut pivotably connected to the door frame and to a central region of the door panel; and
   at least one door guide, comprising:
   a linear slide rail;
   a slide saddle; and
   a hinge connecting the slide saddle to a first edge face of the door panel,
   wherein the door panel is pivotably movable at an end of the strut and is slidably movable along the linear slide rail; and
   wherein, when the door panel is in the open position, the door panel is parallel to the linear slide rail and the at least one strut is enclosed between the door panel and the linear slide rail.

2. The door assembly of claim 1, comprising a door handle and a lock.

3. The door assembly of claim 1, comprising two or more struts and/or door guides.

4. The door assembly of claim 1, wherein the one or more strut is mounted to the door panel such that the one or more strut is located on a side of the door panel away from a passageway when the door panel is in the open position.

5. The door assembly of claim 1, wherein the door frame comprises a first vertical support, a second vertical support, and a third vertical support.

6. The door assembly of claim 5, wherein the door assembly is configured such that opening the door causes the door panel to rotate toward a first vertical support and slide toward a second vertical support.

7. The door assembly of claim 5, wherein the first and second vertical supports are disposed on a hinge side of the door panel, in a plane substantially perpendicular to the door panel when the door panel is in the closed position, and
wherein the third vertical support is disposed at a projected point between the first and second vertical supports and engages with a second edge face of the door panel when the door panel is in the closed position.

8. The door assembly of claim 7, wherein the third vertical support latches and/or locks the door panel in the closed position.

9. The door assembly of claim 5, wherein the one or more strut is mounted on a side of the door panel that faces the linear slide when the door panel is in the open position.

10. The door assembly according to claim 5, wherein the linear slide rail is attached to, and extends linearly between, the first and second vertical supports.

11. An aircraft comprising a door assembly, the door assembly comprising:
a door frame;
a door panel movable between an open position and a closed position;
one or more strut pivotably connected to the door frame and to a central region of the door panel; and
at least one door guide comprising:
a linear slide rail;
a slide saddle; and
a hinge connecting the slide saddle to a first edge face of the door panel,
wherein the door panel is pivotably movable at an end of the strut and is slidably movable along the linear slide rail; and
wherein, when the door panel is in the open position, the door panel is parallel to the linear slide rail and the at least one strut is enclosed between the door panel and the linear slide rail.

12. The aircraft of claim 11, wherein the door assembly is installed independent from adjacent cabin monuments of the aircraft.

13. The aircraft of claim 11, wherein the door assembly is configured to provide rapid decompression venting.

14. A method for operating a door, the method comprising:
providing a door assembly comprising:
a door frame comprising a first vertical support, a second vertical support, and a third vertical support;
a door panel movable between an open position and a closed position and comprising a first side and a second side;
one or more strut pivotably connected to the door frame and to the first side of the door panel; and
at least one door guide, the door guide comprising:
a linear slide rail disposed between the first and second vertical supports;
a slide saddle; and
a hinge connecting the slide saddle to a first edge face of the door panel,
wherein the first and second vertical supports are disposed on a hinge side of the door panel in a plane substantially perpendicular to a plane defined by the door panel in the closed position,
wherein the third vertical support is disposed at a projected point between the first and second vertical supports and engages with a second edge face of the door panel when the door panel is in the closed position, and
wherein the door panel is pivotably movable at an end of the strut and is slidably movable along the linear slide rail;
moving the door panel linearly between the first and second vertical supports while rotating the door panel toward or away from the third vertical support; and
wherein, when the door panel is in the open position, the door panel is parallel to the linear slide wall and the at least one strut is enclosed between the door panel and the linear slide rail.

15. The method according to claim 14, comprising opening the door panel by moving the door panel in a linear motion toward the second vertical support while simultaneously rotating the door panel away from the third vertical support.

16. The method according to claim 15, comprising closing the door panel by moving the door panel in a linear motion toward the first vertical support while simultaneously rotating the door panel toward the third vertical support.

17. The method according to claim 14, comprising closing the door panel by moving the door panel in a linear motion toward the first vertical support while simultaneously rotating the door panel toward the third vertical support.

* * * * *